(12) United States Patent
Modrie et al.

(10) Patent No.: US 7,263,049 B2
(45) Date of Patent: Aug. 28, 2007

(54) SEMI-SYNCHRONOUS RECEIVER AND APPARATUS FOR READING INFORMATION

(75) Inventors: David Modrie, Leuven (BE); Koen Vanhoof, Leuven (BE); Aalbert Stek, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 338 days.

(21) Appl. No.: 10/515,465

(22) PCT Filed: Apr. 30, 2003

(86) PCT No.: PCT/IB03/01792

§ 371 (c)(1),
(2), (4) Date: Nov. 22, 2004

(87) PCT Pub. No.: WO03/100781

PCT Pub. Date: Dec. 4, 2003

(65) Prior Publication Data

US 2006/0198467 A1     Sep. 7, 2006

(30) Foreign Application Priority Data

May 24, 2002   (EP)   .................................. 02077052

(51) Int. Cl.
*G11B 5/09* (2006.01)
(52) U.S. Cl. ................ 369/59.1; 369/44.34; 369/30.18
(58) Field of Classification Search ...................... None
See application file for complete search history.

(56) References Cited

U.S. PATENT DOCUMENTS 5,483,292 A * 1/1996 Ko .............................. 348/537

(Continued)

FOREIGN PATENT DOCUMENTS

DE       19722873 A1    12/1998

(Continued)

*Primary Examiner*—Muhammad Edun (57) ABSTRACT

A receiver is described for delivering a data sequence (ak) at a data rate 1/T from an analog signal (Sa), the receiver comprising: a) converting means (40) for generating a received sequence (rn) by sampling the analog signal (Sa) with a sample rate of 1/Ts, whereby the sample rate 1/Ts of the received sequence (rn) is controllable by a preset value (Pv); b) digital processing means (12) for delivering a processed sequence (yn) by processing the received sequence (rn); c) a first sample rate converter (13) converting the processed sequence (yn) into an equivalent processed sequence (ye) at the data rate 1/T, whereby the data rate of the equivalent processed sequence (ye) is controllable by a control signal (Sc); d) an error generator (14) for delivering an error sequence (ek) from the equivalent processed sequence (ye); e) a control signal generating means (15) for generating the control signal (Sc) dependent on the error sequence (ek); f) a detector (16) for deriving the data sequence (ak) from the equivalent processed sequence (ye), whereby the ratio between the sample rates 1/T and 1/Ts is substantially constant. Conventional synchronous receivers which comprise a Sample Rate Converter have the disadvantage that the digital processing is performed within the control loop of the SRC. The delay resulting from the digital processing contributes to the overall delay of the loop, which can lead to instabilities, especially when high bandwidths are require. Therefore the receiver of the invention does the digital processing outside the control loop. To keep the advantage that the digital processing can be done at a fixed rate, the converting means (40) are controlled by a preset value for keeping the ratio T/Ts constant.

6 Claims, 6 Drawing Sheets

U.S. PATENT DOCUMENTS

| | | | |
|---|---|---|---|
| 5,565,930 A * | 10/1996 | Bolger et al. | 348/572 |
| 5,717,619 A | 2/1998 | Spurbeck et al. | |
| 6,084,916 A | 7/2000 | Ott | |
| 2003/0112854 A1 * | 6/2003 | Shi et al. | 375/147 |

FOREIGN PATENT DOCUMENTS

EP  0658979 A2  6/1995

\* cited by examiner

SEMI-SYNCHRONOUS RECEIVER AND APPARATUS FOR READING INFORMATION

The invention relates to a receiver for delivering a data sequence at a data rate 1/T from an analog signal.

The invention further relates to an apparatus for reading information from an information track on an information carrier.

A receiver for delivering a data sequence can be used in an optical disc player. In the optical disc player an analog replay signal is retrieved from an optical disc. An optical head retrieves the analog replay signal by using a laser. After some analog processing the replay signal is provided to Converting means such as an Analog to Digital converter (ADC). The ADC is controlled by a clock which comes from a Voltage Controlled Oscillator (VCO). The frequency of the clock that is provided by the VCO is dependent on the output of an error generator. The error generator generates an error signal from an output of digital processing means (DPM). The DPM can be an equalizer for instance. The DPM processes the output signal of the ADC. Finally the output of the DPM is fed to a detector to produce the data sequence. All the processing after the ADC is done synchronous with a data rate 1/T of the data sequence.

As receivers for digital recording and transmission are increasingly implemented digitally, the VCO based timing recovery is replaced by a timing recovery using a sample rate converter (SRC). The first part of this receiver also consists of analog processing means and an ADC. The ADC in this receiver is controlled by a free running clock. The free running clock usually is a crystal based clock. The frequency of the clock is independent on the data rate 1/T of the data sequence. The output of the ADC is fed to the sample rate converter (SRC). The SRC is controlled by a Numerical Controlled Oscillator (NCO). The frequency of the output signal of the NCO is dependent on the output signal of an error generator. The error generator reacts on an output of digital processing means (DPM). Again the output of the DPM is fed to a detector to generate the data sequence. The advantage of such synchronously sampled receivers is that the digital signal processing like equalizing for instance, can be done in the symbol rate clock domain retrieved by the timing recovery. On the other hand the delay resulting from this processing contributes to the overall delay of the loop, which can lead to instabilities, especially when high bandwidths are required. This highly constrains the digital processing used in the loop and therefore the performance can potentially severely be degraded.

It is a goal of the invention to provide a receiver which circumvents the above-mentioned problem.

It is a further object of the invention to provide an apparatus for reading information which circumvents the above-mentioned problem.

This goal is achieved with a receiver for delivering a data sequence at a data rate 1/T from an analog signal, the receiver comprising:

converting means for generating a received sequence by sampling the analog signal with a sample rate of 1/Ts, whereby the sample rate 1/Ts of the received sequence is controllable by a preset value;

digital processing means for delivering a processed sequence by processing the received sequence;

a first sample rate converter for converting the processed sequence into an equivalent processed sequence at the data rate 1/T, whereby the data rate of the equivalent processed sequence is controllable by a control signal;

an error generator for delivering an error sequence from the equivalent processed sequence;

a control signal generating means for generating the control signal dependent on the error sequence;

a detector for deriving the data sequence from the equivalent processed sequence, whereby the preset value is set to a value wherein the ratio between the sample rates 1/T and 1/Ts is substantially constant.

The further object is achieved by an apparatus for reading information from an information track on an information carrier, which contains:

means for retrieving the information from the information carrier and outputting an analog signal;

a receiver for delivering a data sequence at a data rate 1/T from an analog signal, the receiver comprising:

converting means for generating a received sequence by sampling the analog signal with a sample rate of 1/Ts, whereby the sample rate 1/Ts of the received sequence is controllable by a preset value;

digital processing means for delivering a processed sequence by processing the received sequence;

a first sample rate converter for converting the processed sequence into an equivalent processed sequence at the data rate 1/T, whereby the data rate of the equivalent processed sequence is controllable by a control signal;

an error generator for delivering an error sequence from the equivalent processed sequence;

a control signal generating means for generating the control signal dependent on the error sequence;

a detector for deriving the data sequence from the equivalent processed sequence, whereby the preset value is set to a value wherein the ratio between the sample rates 1/T and 1/Ts is substantially constant.

Starting from the known receiver topology with an SRC as described before, the digital processing block is moved from its position inside the timing recovery to the asynchronous domain, i.e. between the Analog to Digital Converter ADC and the SRC. Because the processing is positioned in the asynchronous domain, its time span depends now on the over-sample ratio T/Ts, resulting in an oversample dependent performance. Instead of a free running clock the ADC can be controlled by a preset value. The preset value controls the rate at which the ADC makes samples. The preset value is chosen such that the T/Ts ratio has fixed value, a few percents of deviation is possible. The timing recovery, which transfers the signals from the asynchronous Ts domain to the data-rate domain, can be optimized employing the fixed T/Ts ratio. Instead of an ADC controlled by the preset value, also an ADC controlled by a free running clock combined with a second SRC can be used, where the ADC outputs an intermediate received sequence. The second SRC converts the intermediate received sequence into the received sequence, where the sample rate is controlled by the preset value. The combination of the ADC with the second SRC results in the same received sequence compared to the preset value controlled ADC.

In a further embodiment of the invention the receiver comprises lock aid means for keeping the ratio between the sample rates 1/T and 1/Ts substantially constant by generating the preset value of either the preset value controlled ADC or of the second sample rate converter. There are different ways for the lock aid means to realize this. For instance, the lock aid means can generate the preset value by keeping an average number of transitions of the equivalent received sequence in relation to the data rate 1/T substantially constant. The data consists of bit-streams which usually have maximum run-lengths, i.e. a maximum number of subsequent zeros or ones. In a bit-stream of a certain length the average number of transitions will therefore be substantially constant. By using this average number as a control parameter for the preset value, the lock aid means are able to keep the sample rates 1/T and 1/Ts substantially constant.

If the receiver is used in an apparatus for reading information from an information track on an information carrier, where the information track comprises a wobble having a wobble-frequency related to the data rate 1/T, the lock aid means are able to generate the preset value as a function of the wobble-frequency. For instance, in the DVD+RW format a wobble is present on the DVD disc. The wobble is synchronous to the data on the DVD. The lock aid means can therefore use the wobble signal to keep the sample rates 1/T and 1/Ts substantially constant, for instance by fixing the ratio between the wobble-frequency and the sample rate 1/Ts.

These and other aspects of the invention will be apparent from and elucidated further with reference to the embodiments described by way of example in the following description and with reference to the accompanying drawings, in which.

Figure 1:
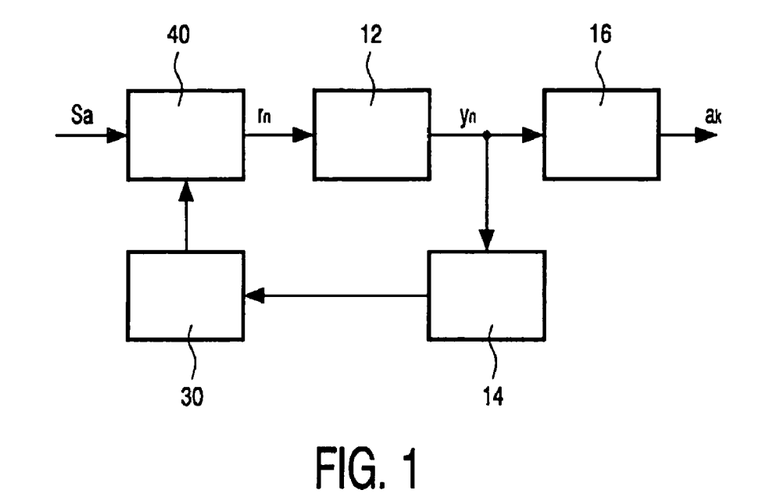
FIG. 1 shows a prior art receiver.

The prior art receiver depicted in FIG. 1 has converting means 40 to convert an analog signal Sa into a received sequence $r_n$. The converting means 40 usually are Analog to Digital Converters (ADC). The ADC samples the analog signal Sa at a sample rate 1/Tc and the sample rate is controlled by a Voltage Controlled Oscillator 30. The VCO forms a phase locked loop (PLL) together with an error generator 14. The output of the VCO has a frequency dependent on a voltage level at an input. In FIG. 1 an output of the error generator 14 controls the frequency of the VCO. The received sequence $r_n$ is processed by the digital processing means 12. The digital processing means 12 can for instance be an equalizer to equalize the received sequence $r_n$. The result of the digital processing is a processed sequence $y_n$. The processed sequence $y_n$ is fed to the error generator 14 and to a detector 16. The detector 16 derives the data sequence $a_k$ from the processed sequence $y_n$.

Figure 2:
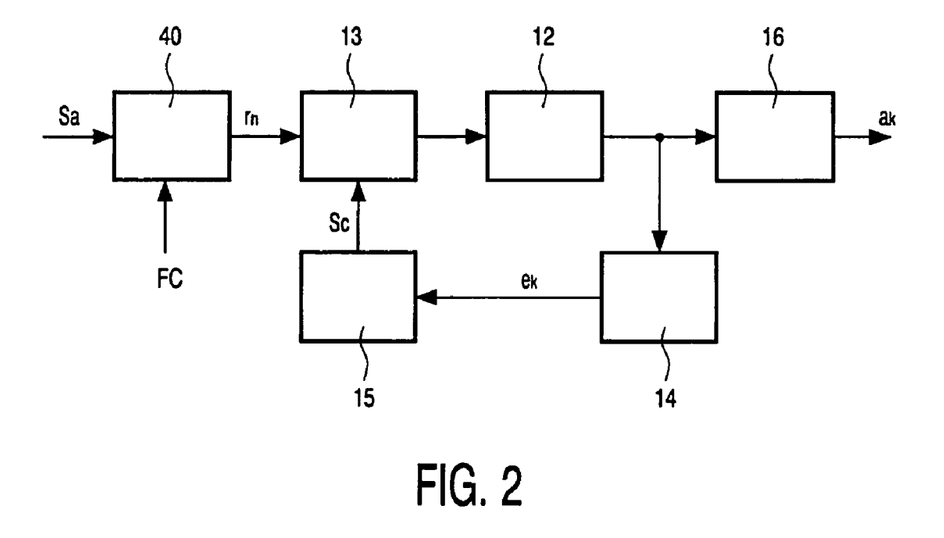
FIG. 2 shows a prior art receiver with a sample rate converter.

In FIG. 2 the VCO based timing recovery is converted to a timing recovery using a sample rate converter 13 (SRC).

The converting means 40 are now controlled by a free running clock FC. The frequency of the clock is independent of the data rate 1/T of the data sequence $a_k$. The SRC is controlled by control signal generating means 15. The control signal generating means 15 can for instance be a Numerical Controlled Oscillator (NCO). The frequency of the output signal of the NCO is dependent on the output signal of the error generator 14. The advantage of such synchronously sampled receivers is that the digital processing by the digital processing means 12 can be done in the symbol rate clock domain retrieved by the timing recovery. On the other hand the delay resulting from this processing contributes to the overall delay of the loop, which can lead to instabilities, especially when high bandwidths are required. This highly constrains the digital processing used in the loop and therefore the performance can potentially severely be degraded.

Figure 3:
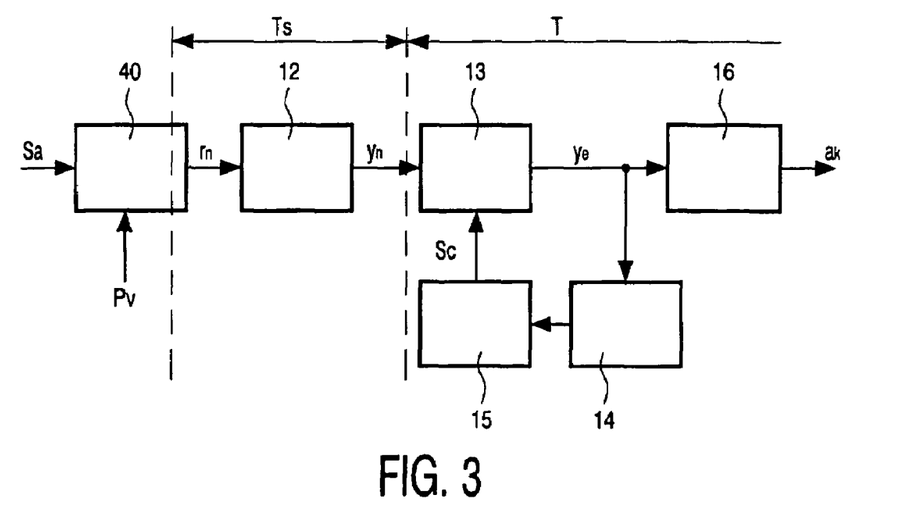
FIG. 3 shows a receiver according to the invention.

To eliminate the delay, the digital processing block 12 can be moved from its position inside the timing recovery to the asynchronous domain Ts as depicted in FIG. 3. Now the digital processing means 12 is positioned between the converting means 40 and the sample rate converter 13. Because the processing is positioned in the asynchronous domain, its time span depends now on the over-sample ratio T/Ts, resulting in an oversample dependent performance. Therefore, in the receiver according to the invention, instead of using a free running clock FC to control the sample ratio of the converting means 40, a preset value Pv is used to control the sample ratio of the converting means 40. The preset value Pv is chosen such that the T/Ts ratio has fixed value, a few percents of deviation is possible. The timing recovery, which transfers the signals from the asynchronous Ts domain to the data-rate domain, can be optimized employing the fixed T/Ts ratio.

Figure 4:
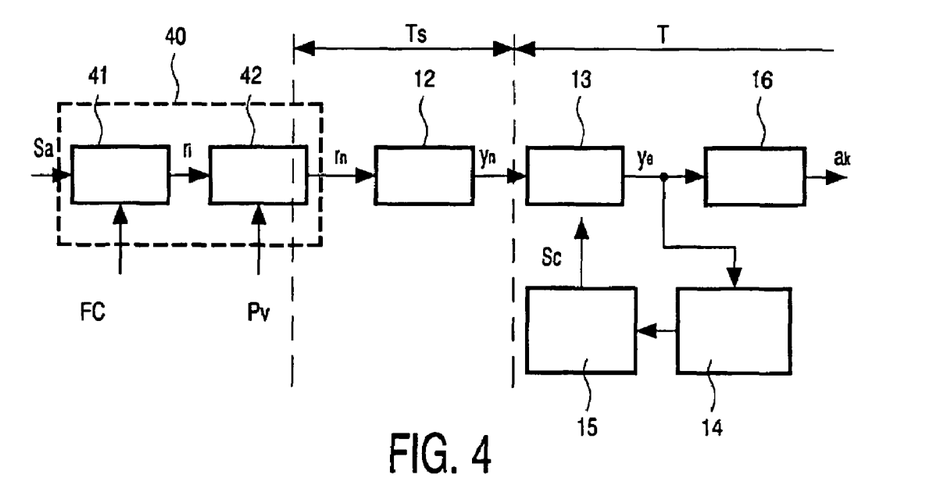
FIG. 4 shows an other embodiment of the receiver of the invention.

The converting means 40 can be realized with an ADC operating at a sample rate which is controllable by the preset value Pv. Alternatively, the converting means 40 can be realized with an ADC 41 controlled by a free running clock FC combined with an SRC 42 as depicted in FIG. 4. In FIG. 4 the converting means 40 comprises an ADC 41 and a second sample rate converter 42. The ADC 41 converts the analog signal Sa into an intermediate received sequence $r_i$. After the ADC 41 the second sample rate converter 42 converts the intermediate received sequence $r_i$ into the received sequence $r_n$ at a sample rate 1/Ts controlled by the preset value Pv.

Figure 5:
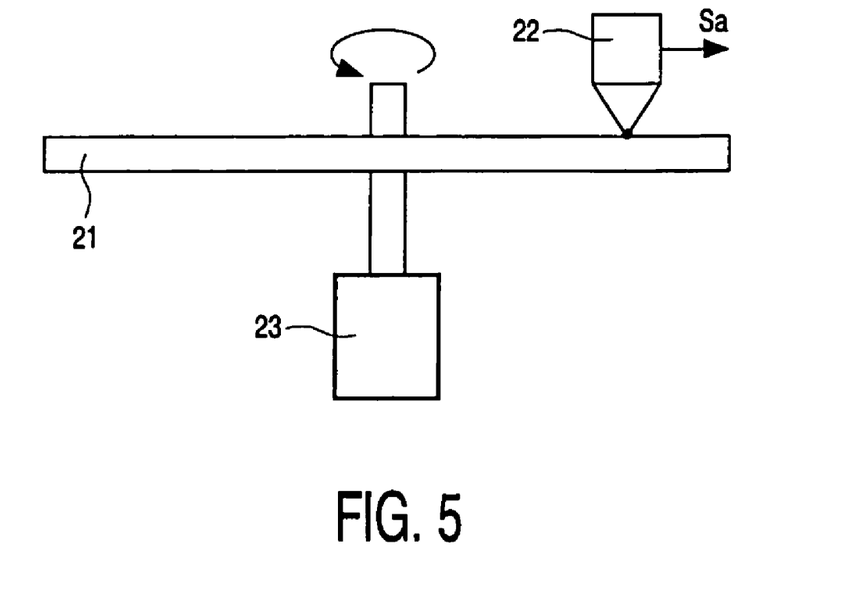
FIG. 5 shows an embodiment of an apparatus for reading information from an information track on an information carrier.
Figure 6:
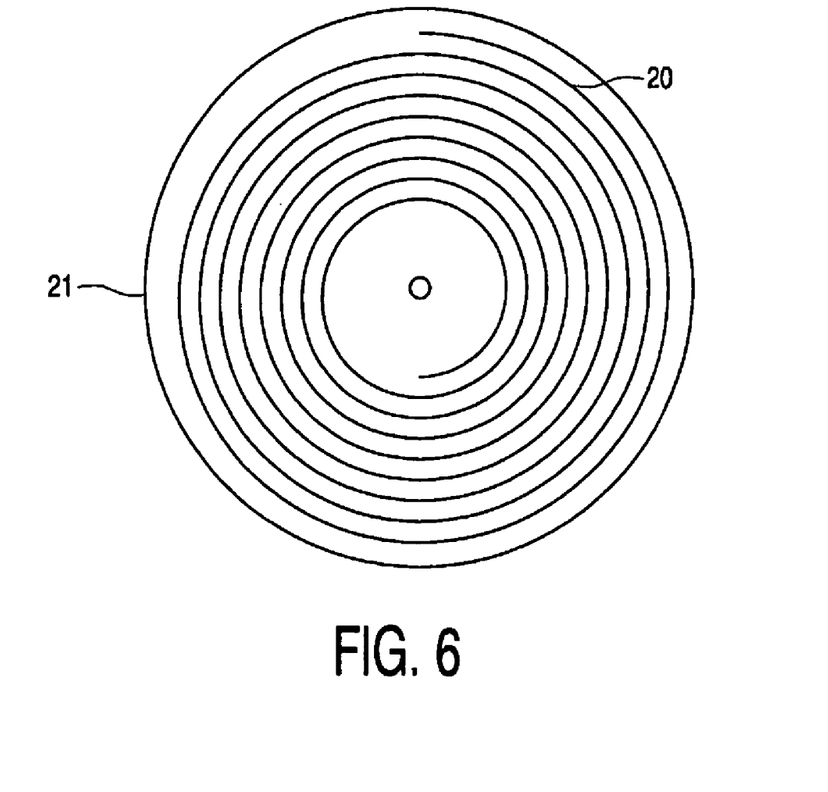
FIG. 6 shows an example of an information carrier with an information track thereon.

In FIG. 5 an apparatus for reading information is depicted. In FIG. 6 an information carrier 21 with an information track 20 is shown. The apparatus in FIG. 5 comprises rotation means 23 to rotate the information carrier 21. Furthermore, the apparatus comprises means 22 for retrieving the information from the information carrier 21. In a CD player for instance, the means 22 comprise an optical pickup unit (OPU). The OPU generates a laserbeam that is projected on the surface of the information carrier 21. The laserbeam is reflected by the surface of the information carrier 21 and projected by the OPU on detection means. The detection means generate the analog signal Sa. The signal coming from the detection means can also be pre-processed by analog processing means before the analog signal Sa is outputted.

As a test case the above-mentioned principle is tried on the fully digital receiver used in optical read-out systems. The starting point is the receiver of FIG. 2 where the converting means 40 consist of an ADC, and the digital processing means 12 consist of a finite impulse response (FIR) filter or equalizer. The control generating means 15 consist of a numerically controlled oscillator. Because the equalizer is positioned inside the loop, it equalizes the signal always in the symbol rate domain. However its delay consisting of an intrinsic delay and of a pipelining delay contributes to the overall delay of the loop which can lead to instabilities, especially when high bandwidths are required. This highly constrains the equalizer applicable in the loop.

Figure 7A:
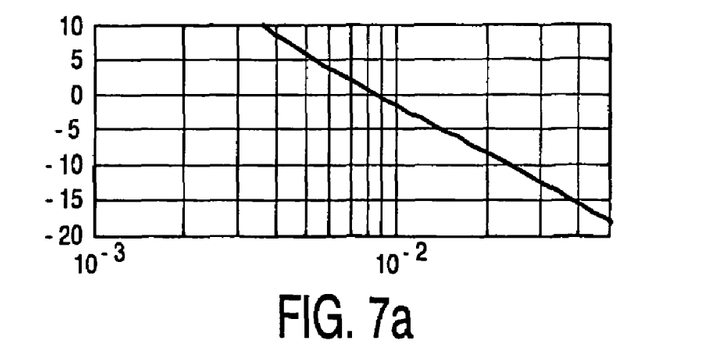
FIG. 7a and FIG. 7b show a bode diagram of a receiver with loop delay.
Figure 7B:
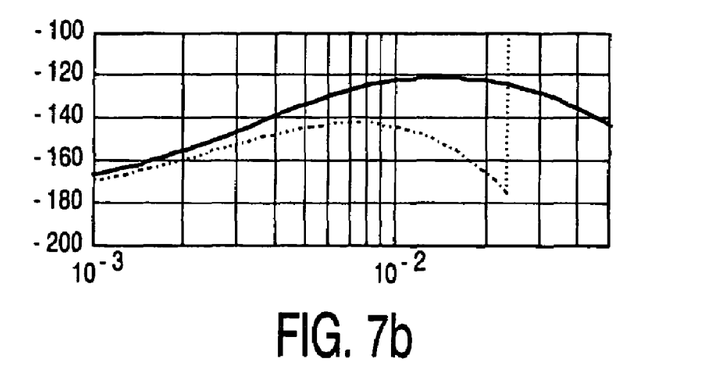

In FIG. 7b the decrease in phase margin when delays are added in the loop can be seen. On the horizontal axis in FIGS. 7a and 7b the normalized frequency is depicted, where the normalized frequency is the frequency in relation to the sample frequency. The vertical axis in FIG. 7a represents the magnitude of the transfer-function in decibel of the receiver. The vertical axis in FIG. 7b represents the phase in degrees. The full line in FIG. 7b is the phase graph of the receiver without delays, and the dotted line is the phase graph of the receiver with delays.

Figure 8:
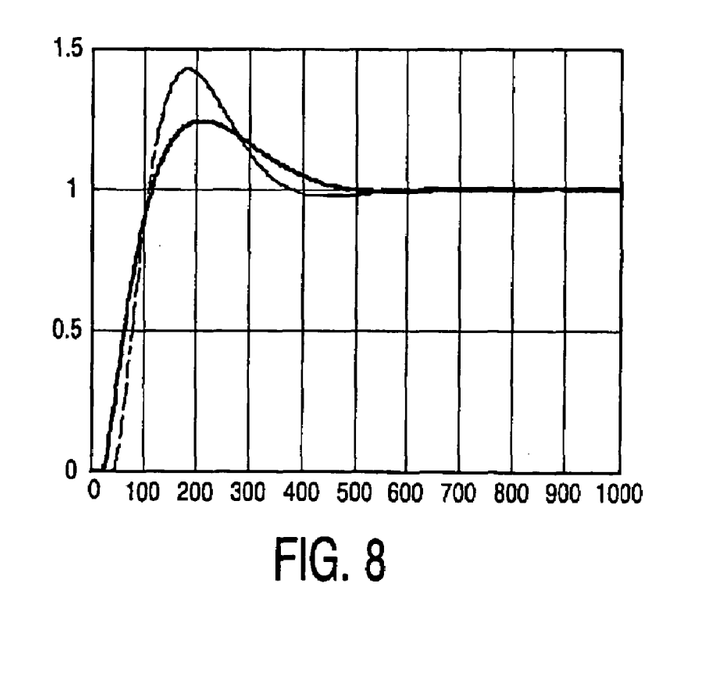
FIG. 8 shows two step responses of a receiver with and without loop delays.

In FIG. 8 the step-response of the loop with and without delays is shown. The dotted line is the step-response with delay and the full line the step-response without delay. On the horizontal axis the elapsed time in synchronous bitclock periods is depicted and on the vertical axis the amplitude is represented.

Figure 9A:
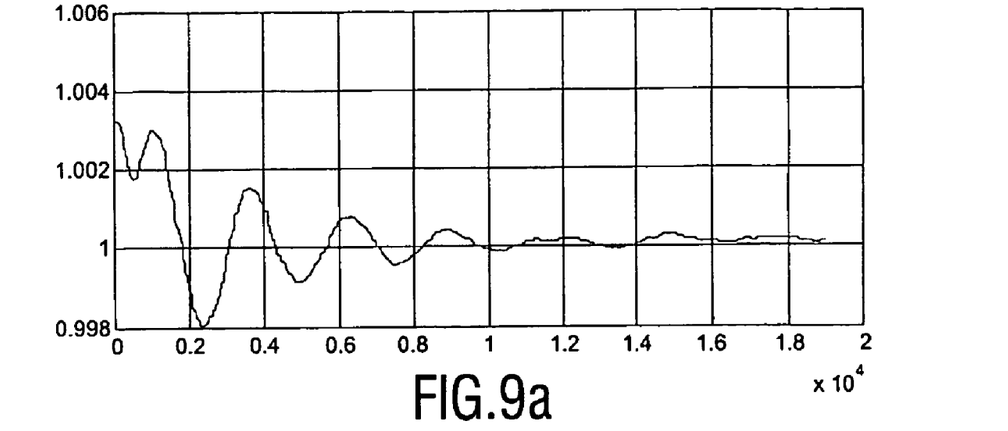
FIG. 9a shows a frequency response of the classical timing recovery with delays at high bandwidths.
Figure 9B:
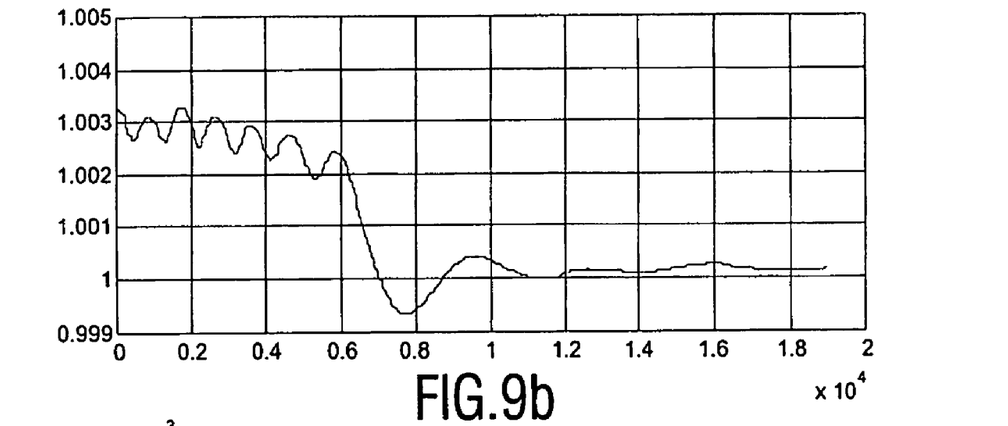
FIG. 9b shows a frequency response of the classical timing recovery with delays at low bandwidths.

In addition the frequency response of the classical timing recovery with delays is shown at high and low bandwidth in FIG. 9a and FIG. 9b respectively. On the horizontal axis the elapsed time in fixed clock period is set out and on the vertical axis the normalized frequency, i.e. (1/T), is set out. It is obvious that with a large amount of delays inside the loop doesn't allow high bandwidths.

From these plots one can easily derive that the amount of delays can severely degrade the performance of the system. Therefore the order or the time span of the FIR filter inside the loop is highly constrained which can result in degraded performance.

Figure 9C:
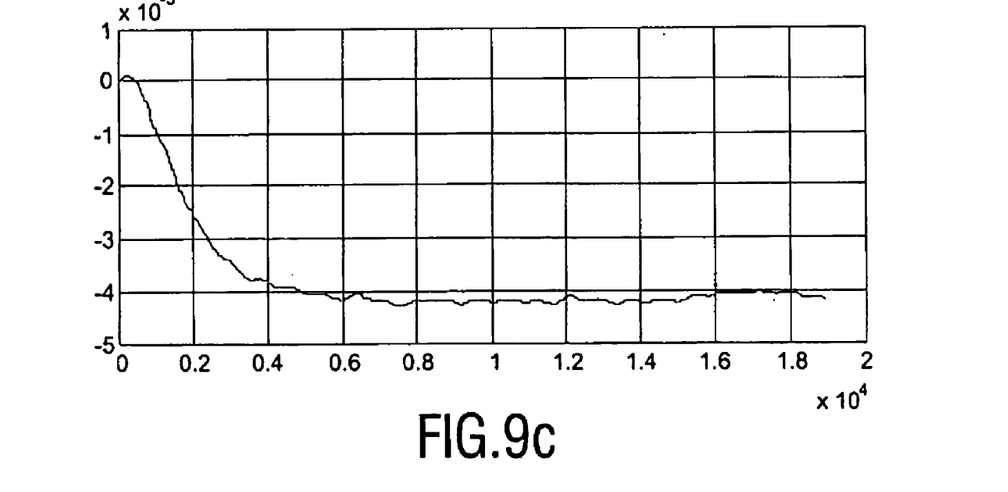
FIG. 9c shows a frequency response of the receiver according to the invention at high bandwidths.

In FIG. 9c the frequency response at high bandwidths of the receiver according to the invention is shown. Here, the vertical axis represents the ratio T/Ts. The converting means 40 consist of an ADC, and the digital processing means 12 consist of an equalizer. The preset is chosen such that the T/Ts ratio has fixed value: the equalizer has now a fixed time span independent on the oversample ratio of the data rate clock 1/T and the free running clock FC. Hence the performance will be independent on the position on the disc in CAV (Constant Angular Velocity) mode.

Figure 10:
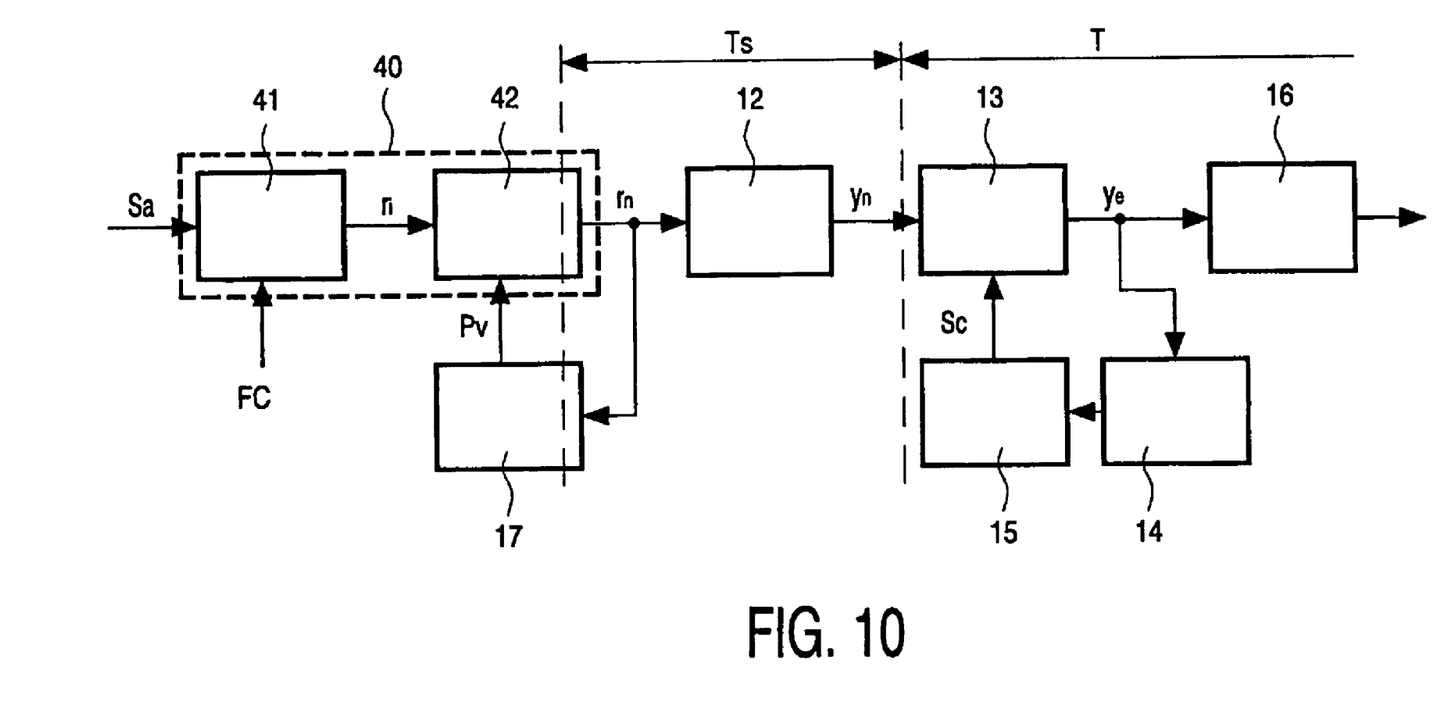
FIG. 10 shows an embodiment of the receiver according to the invention with lock aid means.

The preset value Pv can be determined using lock aid means. A receiver with lock aid means 17 is depicted in FIG. 10. The lock aid means 17 in FIG. 10 is a so-called Transition probability lock aid. The preset value Pv is driven such that the average number of transitions per bit clock measured after the converting means 40 is a fixed fraction. This fraction depends on the modulation code used. The lock aid means 17 have a wide capture without false locks, but is inherently slow since a large number of transitions must be observed.

The lock aid means 17 can also lock on the wobble frequency. The preset value Pv is driven by the wobble frequency. These lock aid means 17 can only be used in optical disc formats that have a wobble with a frequency related to the bit frequency. Practically this is suitable for the all recordable/rewritable formats.

The timing recovery, which transfers the signals from the semi-asynchronous Ts domain to the data-rate domain, can be optimized employing the fixed T/Ts ratio. It is of no use to design a timing recovery which can convert a wide range of oversample ratios. The optimization can lead an even smaller loop delay.

The timing recovery is now directly driven by the zero-crossing informations, resulting in a system with a small capture range and a reduced amount of loop delay.

This invention proposes an alternative structure for the 'synchronous' digital read-out receiver. This new semi-synchronous receiver topology still has the advantage of frequency scalability without introducing constraints to the digital processing. Therefore it is very suitable for high density/capacity optical disc formats, which acquire advanced signal processing in order to detect the bits accurately.

The invention claimed is:

1. A receiver for retrieving a data sequence ($a_k$) at a data rate 1/T from an analog signal (Sa), the receiver comprising:
converting means for generating a received sequence ($r_n$) by sampling the analog signal (Sa) with a sample rate of 1/Ts, whereby the sample rate 1/Ts of the received sequence ($r_n$) is controllable by a preset value (Pv);
digital processing means for delivering a processed sequence ($y_n$) by processing the received sequence ($r_n$);
a first sample rate converter for converting the processed sequence ($y_n$) into an equivalent processed sequence ($y_e$) at the data rate 1/T, whereby the data rate of the equivalent processed sequence ($y_e$) is controllable by a control signal (Sc);
an error generator for delivering an error sequence ($e_k$) from the equivalent processed sequence ($y_e$);
control signal generating means for generating the control signal (Sc) dependent on the error sequence ($e_k$); and
a detector for deriving the data sequence ($a_k$) from the equivalent processed sequence ($y_e$),
whereby the preset value (Pv) is set to a value wherein the ratio between the sample rates 1/T and 1/Ts is substantially constant.

2. The receiver as claimed in claim 1, characterized in that the converting means comprises:
an analog to digital converter for generating an intermediate received sequence ($r_i$) by sampling the analog signal (Sa) at a clock rate 1/Tc, asynchronous to the data rate 1/T; and
a second sample rate converter for converting the intermediate received sequence ($r_i$) into the received sequence ($r_n$) with a sample rate of 1/Ts, whereby the sample rate 1/Ts of the received sequence ($r_n$) is controllable by the preset value (Pv).

3. The receiver as claimed in claim 1 or 2, characterized in that the receiver further comprises:
lock aid means for keeping the ratio between the sample rates 1/T and 1/Ts substantially constant by generating the preset value (Pv).

4. The receiver as claimed in claim 3, characterized in that the lock aid means generates the preset value (Pv) such that an average number of transitions of the equivalent received sequence ($r_e$) in relation to the data rate 1/T is substantially constant.

5. An apparatus for reading information from an information track on an information carrier said apparatus comprising:
means for retrieving the information from the information carrier and for outputting an analog signal (Sa); and
a receiver for delivering a data sequence ($a_k$) at a data rate 1/T from the analog signal (Sa),
wherein said receiver comprises:

converting means for generating a received sequence ($r_n$) by sampling the analog signal (Sa) with a sample rate of 1/Ts, whereby the sample rate 1/Ts of the received sequence ($r_n$) is controllable by a preset value (Pv);

digital processing means for delivering a processed sequence ($y_n$) by processing the received sequence ($r_n$);

a first sample rate converter for converting the processed sequence ($y_n$) into an equivalent processed sequence ($y_e$) at the data rate 1/T, whereby the data rate of the equivalent processed sequence ($y_e$) is controllable by a control signal (Sc);

an error generator for delivering an error sequence ($e_k$) from the equivalent processed sequence ($y_e$);

control signal generating means for generating the control signal (Sc) dependent on the error sequence ($e_k$); and a detector for deriving the data sequence ($a_k$) from the equivalent processed sequence ($y_e$), whereby the preset value (Pv) is set to a value wherein the ratio between the sample rates 1/T and 1/Ts is substantially constant.

6. The apparatus as claimed in claim 5 wherein the receiver further comprises lock aid means for keeping the ratio between the sample rates 1/T and 1/Ts substantially constant by generating the preset value (Pv), characterized in that the information track comprises a wobble having a wobble-frequency related to the data rate 1/T, the and lock aid means generates the preset value as a function of the wobble-frequency.

* * * * *